No. 12,741. REISSUED JAN. 21, 1908.

F. B. MORTON.

DRAINAGE FITTING.

APPLICATION FILED OCT. 14, 1907.

Witnesses:
S. B. Austin.
Theo. L. Fitch

Inventor:
Fred B. Morton
By G. H. Korpham
Attorney

THE NORRIS PETERS CO., WASHINGTON, D. C.

UNITED STATES PATENT OFFICE.

FRED B. MORTON, OF PASADENA, CALIFORNIA.

DRAINAGE-FITTING.

No. 12,741. Specification of Reissued Letters Patent. Reissued Jan. 21, 1908.

Original No. 848,259, dated March 26, 1907, Serial No. 330,307. Application for reissue filed October 14, 1907. Serial No. 397,462.

*To all whom it may concern:*

Be it known that I, FRED B. MORTON, a citizen of the United States, residing at Pasadena, in the county of Los Angeles and State of California, have invented new and useful Improvements in Drainage-Fittings, of which the following is a specification.

My invention relates to a plumbing fitting for use in waste and ventilating pipes that are placed in partitions and which afford outlets and ventilation on both sides of the partition; and the object thereof is to provide a fixture that when used in a pipe in a partition will absolutely safe-guard the trap of the fixture on one side of said partition from being siphoned out when the waste in the fixture of the other side of the partition is passing through the fitting, and to prevent water from one fixture from passing into the outlet of the other fixture; another object is to provide a fitting in which straight walls and sharp angles are avoided and in which curved full discharge clearances are provided. I accomplish this object by means of the fitting described herein and illustrated in the accompanying drawings in which:—

Figure 1:
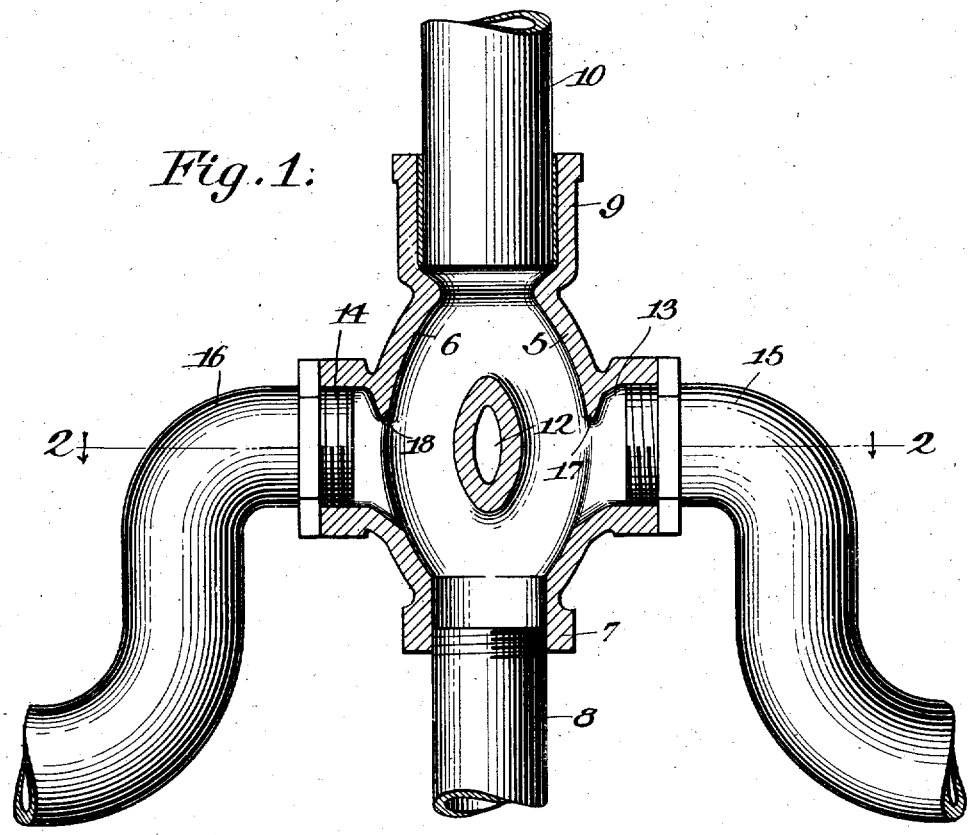
Figure 2:
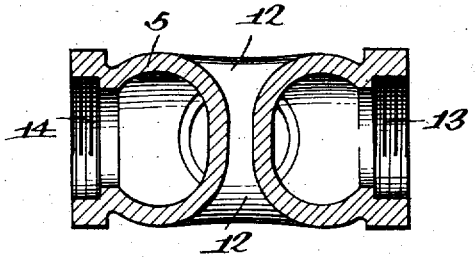

Figure 1 is a central longitudinal section taken through the outlets, showing the pipe connection in elevation. Fig. 2 is a transverse section of the tee taken on line 2—2 of Fig. 1.

In the drawings the fitting is shown as composed of two oppositely curved pipes 5 and 6 having a common bottom 7 to which is connected the waste pipe 8. These pipes have a common top 9 to which is connected the usual vent pipe 10, which when there are several floors, is connected to a common vent outlet pipe (not shown). Between the common top and the bottom these pipes are preferably separated to form an elliptical opening 12 therethrough as thereby the inner surfaces are all curved surfaces and all sharp corners in which waste commonly lodges are avoided. At opposite sides of pipes 5 and 6 are the inlets 13 and 14 for the reception of the fixture pipes 15 and 16. The upper edges of these inlet openings form deflector tongues 17 and 18 to deflect the water downwardly. The lower edges of these inlets slope downwardly to compensate for the tongues that they may not obstruct the passage of water therethrough. It will thus be seen that the fixture connected to either outlet may be used, without in the slightest manner affecting the opposite fixture as each discharges into an independent passage, and that both passages are independently vented so that one can not siphon the trap of the other. It will further be seen that from the inlets 13 and 14 both upwardly and downwardly the passages are substantially circular in cross-section, thereby as before stated avoiding sharp corners and providing curved surfaces over which waste will flow freely. This fitting is cast in a single piece and is simple in construction and can be quickly put in place, and has no leakable joints.

What I claim is:—

1. A fitting comprising two pipes having circular passages therethrough and having a common top and bottom and provided with inlets on opposite sides thereof.

2. A fitting comprising two oppositely curved pipes having circular passages therethrough and having a common top and bottom and provided with inlets on opposite sides thereof.

3. A fitting comprising a casing provided with two circular passages, said passages having a common top and bottom and two opposed inlets on said passages, one on each passage at points where said passages are separated.

4. A fitting comprising two oppositely-curved pipes having circular passages therethrough, said pipes being united at the top and bottom and provided with inlets on the opposite sides thereof, the whole being cast in one piece.

In witness that I claim the foregoing I have hereunto subscribed my name this 7 day of August, 1906.

FRED B. MORTON.

Witnesses:
EDMUND A. STRAUSE,
B. M. WILKINSON.